(12) United States Patent
Kim et al.

(10) Patent No.: US 10,684,813 B2
(45) Date of Patent: Jun. 16, 2020

(54) DISPLAY DEVICE AND METHOD FOR CONTROLLING SAME

(71) Applicant: SAMSUNG ELECTRONICS CO., LTD., Suwon-si, Gyeonggi-do (KR)

(72) Inventors: Chul-joo Kim, Suwon-si (KR); Yoon-kyung Lee, Seoul (KR); Young-chul Sohn, Seoul (KR); Sang-jeong Lee, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/749,230

(22) PCT Filed: Aug. 9, 2016

(86) PCT No.: PCT/KR2016/008723
§ 371 (c)(1),
(2) Date: Jan. 31, 2018

(87) PCT Pub. No.: WO2017/034178
PCT Pub. Date: Mar. 2, 2017

(65) Prior Publication Data
US 2018/0225076 A1   Aug. 9, 2018

(30) Foreign Application Priority Data
Aug. 21, 2015   (KR) .................. 10-2015-0117973

(51) Int. Cl.
*G06F 3/14* (2006.01)
*G06F 3/0481* (2013.01)

(52) U.S. Cl.
CPC .......... *G06F 3/1454* (2013.01); *G06F 3/0481* (2013.01); *G06F 3/1423* (2013.01);
(Continued)

(58) Field of Classification Search
CPC .... G06F 3/1454; G06F 3/0481; G06F 3/1423; G06F 3/1446; G09G 2356/00; G09G 2354/00
See application file for complete search history.

(56) References Cited

U.S. PATENT DOCUMENTS

| | | | |
|---|---|---|---|
| 8,456,381 B2 * | 6/2013 | Pering | G06F 3/1423 345/2.3 |
| 8,786,517 B2 * | 7/2014 | Lewin | G06F 3/1446 345/1.3 |

(Continued)

FOREIGN PATENT DOCUMENTS

| | | |
|---|---|---|
| EP | 2 869 188 | 5/2015 |
| KR | 10-2012-0097210 | 9/2012 |

(Continued)

OTHER PUBLICATIONS

Extended European Search Report dated Jun. 5, 2018 for European Patent Application No. 16839467.4 (8 pages).

(Continued)

*Primary Examiner* — Mihir K Rayan
(74) *Attorney, Agent, or Firm* — Nixon & Vanderhye, P.C.

(57) ABSTRACT

Disclosed are a display device and a method for controlling the same. The method for controlling a display device according to the present invention comprises the steps of: displaying an execution screen of an application which is divided into a plurality of regions; extracting source information related to a region, from among the plurality of regions, to be transmitted to a peripheral device; and transmitting the extracted source information to the peripheral device. Accordingly, the display device can more efficiently provide multi-UI services between a plurality of peripheral devices.

13 Claims, 16 Drawing Sheets

(52) U.S. Cl.
CPC ....... *G06F 3/1446* (2013.01); *G09G 2354/00* (2013.01); *G09G 2356/00* (2013.01)

(56) References Cited

U.S. PATENT DOCUMENTS

| | | | |
|---|---|---|---|
| 2006/0129933 A1* | 6/2006 | Land | G11B 27/034 |
| | | | 715/723 |
| 2010/0328469 A1* | 12/2010 | Hashimoto | G06F 3/1454 |
| | | | 348/207.1 |
| 2013/0024778 A1 | 1/2013 | Reeves et al. | |
| 2013/0132848 A1 | 5/2013 | Bhatt | |
| 2013/0159565 A1* | 6/2013 | Soyannwo | G06F 9/452 |
| | | | 710/33 |
| 2013/0214995 A1* | 8/2013 | Lewin | G06F 3/1446 |
| | | | 345/1.3 |
| 2013/0214996 A1 | 8/2013 | Reeves et al. | |
| 2013/0219285 A1 | 8/2013 | Iwasaki | |
| 2014/0104139 A1* | 4/2014 | Buchner | G06F 3/1438 |
| | | | 345/1.3 |
| 2014/0188970 A1 | 7/2014 | Madhok et al. | |
| 2015/0081764 A1 | 3/2015 | Zhao et al. | |
| 2015/0082184 A1* | 3/2015 | Kim | H04L 67/10 |
| | | | 715/740 |
| 2016/0179295 A1* | 6/2016 | Liang | H04W 76/10 |
| | | | 715/740 |

FOREIGN PATENT DOCUMENTS

| | | |
|---|---|---|
| KR | 10-1218293 | 1/2013 |
| KR | 10-2014-0080224 | 6/2014 |
| KR | 10-2015-0000024 | 1/2015 |
| KR | 10-2015-0032070 | 3/2015 |
| WO | 2012/141693 | 10/2012 |

OTHER PUBLICATIONS

International Search Report for PCT/KR2016/008723 dated Nov. 8, 2016, 4 pages.
Written Opinion w/ English Translation for PCT/KR2016/008723 dated Nov. 8, 2016, 13 pages.

* cited by examiner (a)

(b)

DISPLAY DEVICE AND METHOD FOR CONTROLLING SAME

This application is the U.S. national phase of International Application No. PCT/KR2016/008723 filed Aug. 9, 2016 which designated the U.S. and claims priority to KR Patent Application No. 10-2015-0117973 filed Aug. 21, 2015, the entire contents of each of which are hereby incorporated by reference.

TECHNICAL FIELD

The present disclosure relates to a display device and a controlling method thereof and, more particularly, to a display device which performs a multi UI service with a peripheral device and a controlling method thereof.

BACKGROUND ART

Various applications have been developed according to the development of electronic devices. In recent years, an application has been developed in which a plurality f users can participate together through an interaction between electronic devices.

However, in order for a plurality of users to participate through such an application, the corresponding application must be installed in each electronic device for each user. In addition, the development of applications suitable for the installed operating system for each electronic device and the management of each application developed for each operating system should be continuously maintained. Accordingly, there is a problem that not only an additional cost is incurred in developing an application for each operating system with respect to one application, but also an increase in cost due to maintenance for an application developed for each operating system occurs.

Meanwhile, in the conventional method of providing a multi-UI service among the plurality of electronic devices, the service merely transmits the previously stored contents from the main device to the target device through the mirroring method. Furthermore, since the conventional multi-UI service providing method is a method of transmitting the corresponding contents to the target device, there is a problem that the data amount increases due to the transmission, which causes slowdown of data transmission speed.

DETAILED DESCRIPTION

Tasks to be Solved

It is an object of the present invention to provide a multi-UI service between a plurality electronic devices more efficiently.

Means for Solving Problems

According to an exemplary embodiment, a method for controlling a display device includes displaying an execution screen of an application which is divided into a plurality of regions; extracting source information related to a region, from among the plurality of regions, to be transmitted to a peripheral device; and transmitting the extracted source information to the peripheral device.

The extracting may include, in response to the peripheral device approaching, determining a position where the peripheral device approaches, extracting source information of a first region relating to the determined position from among the plurality of regions, wherein the peripheral device displays information of the first region based on source information received from the display device.

The extracting may include, in response to the peripheral device approaching, extracting source information of a first region, from among the plurality of regions, executable by the peripheral device based on device information of the peripheral device, wherein the peripheral device displays information of the first region based on source information received from the display device.

The extracting may include, in response to the peripheral device approaching, extracting source information of a region executable by the peripheral device based on device information of the peripheral device and execution information of the plurality of regions and transmitting the information to the peripheral device.

The transmitting may include, in response to a first region, from among the plurality of regions, being a region for receiving a user command or displaying user information, transmitting source information of the first region to a first peripheral device, from among the approaching peripheral devices, corresponding to a preset first condition, and in response to a second region, from among the plurality of regions, displaying a content, transmitting source information of the second region to a second peripheral device, from among the approaching peripheral devices, corresponding to a preset second condition.

The extracting may include extracting source information of a first area corresponding to a user command from among the plurality of areas, and wherein the transmitting may include transmitting source information of the first area to a peripheral device corresponding to a user command from among the peripheral devices capable of communicating.

The method may further include editing and displaying the execution screen based on an area other than an area related to source information transmitted to the peripheral device from among the plurality of areas.

The editing and displaying the execution screen may include, when an execution screen return command is input or an event is detected in which the peripheral device transmitting the source information is not close, re-editing and displaying the edited execution screen as an initial execution screen of the application, and when an event to transmit source information related to the changed area to the peripheral device occurs, re-editing and displaying the edited execution screen based on an area other than the changed area from among the plurality of areas.

The method may further include controlling an operation of the application based on the received user command, when a user command is received from a peripheral device which transmits the source information.

The source information may include at least one of an execution code and resource for executing a first area to be transmitted to the peripheral device, and the extracting may include extracting source information relating to the first area by analyzing predetermined source information relating to the first area and an execution code for executing the first area.

According to still another exemplary embodiment, a display device includes a communicator configured to perform data communication with a peripheral device capable of communication; a display configured to display an execution screen of an application which is divided into a plurality of areas; and a controller configured to control the communicator to extract source information related to an area to be transmitted to the peripheral device from among prestored source information related to a plurality of areas constituting the application execution screen and transmit the extracted source information to the peripheral device.

The display device further includes at least one sensor configured to sense proximity of the peripheral device, wherein the controller, if it is sensed that the peripheral device is adjacent, determines a position where the peripheral device is adjacent, extracts source information of the first area relating to the determined position and transmits to the first peripheral device, and the peripheral device displays information of the first area based on the source information received from the display device.

The display device further includes at least one sensor configured to sense proximity of the peripheral device, wherein the controller, if it is sensed that the peripheral device is adjacent through the sensor, extracts source information of the first area executable by the peripheral device from among the plurality of areas based on device information of the peripheral device, transmits the extracted source information to the peripheral device, and the peripheral device displays information of the first area based on the source information received from the display device.

The display device further includes at least one sensor for sensing proximity of the peripheral device, wherein the controller, if it is sensed that the peripheral device is adjacent through the sensor, extracts source information of the executable area by the peripheral device based on device information of the peripheral device and execution information by the plurality of areas and transmits the information to the peripheral device.

The controller, if the first area from among the plurality of areas is an area for receiving a user command or displaying user information, transmits source information of the first area to the first peripheral device corresponding to a preset first condition and if a second area is an area for displaying a content, transmits source information of the second area to the second peripheral device according to a preset second condition.

The device further includes an input unit for receiving a user command, and the controller, according to a user command input through the input unit, may control the communicator to extract source information of the first area corresponding to the user command and transmit the extracted source information to the peripheral device corresponding to the user command.

The controller may control the display to edit and display the execution screen based on an area other than an area relating to source information transmitted to the peripheral device from among the plurality of areas.

The controller, when an execution screen return command is input or an event is detected in which the peripheral device transmitting the source information is not close, may re-edit and display the edited execution screen as an initial execution screen of the application, and when an event for transmitting source information related to an area changed to the peripheral device occurs, the display device may re-edit the edited execution screen based on the remaining area except for the changed area among the plurality of areas, and display the execution screen of the re-edited application.

The controller, when a user command is received from a peripheral device which transmits the source information, may control an operation of the application based on the received user command.

The source information includes at least one of an execution code and resource for executing a first area to be transmitted to the peripheral device, and the controller may analyze predefined source information or an execution code for executing the first area and extract source information relating to the first area.

Effect of Invention

According to various exemplary embodiments, the display device according to the present disclosure may provide a multi UI service between a plurality of peripheral devices more efficiently.

BEST MODE

Detailed Description

Hereinafter, an exemplary embodiment of the present disclosure will be described in a greater detail with reference to the drawings attached.

Figure 1:
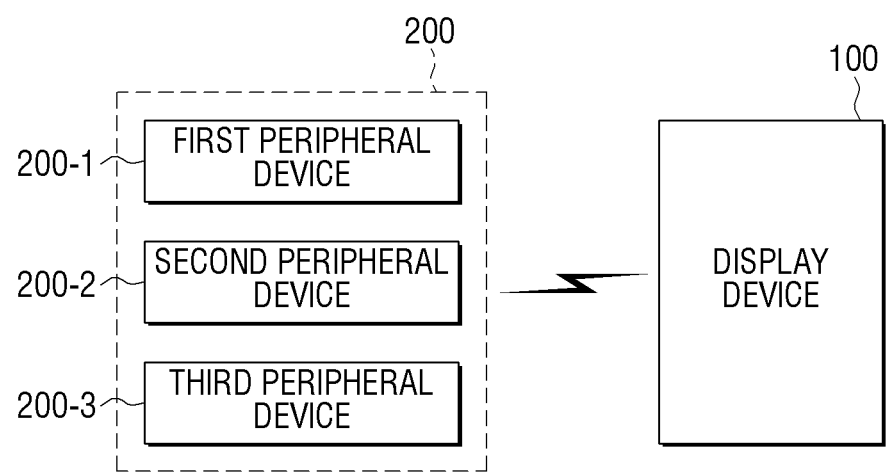
FIG. 1 is a block diagram briefly illustrating a configuration of a multi UI service system according to an exemplary embodiment.

FIG. 1 is a block diagram briefly illustrating a configuration of a multi UI system according to an exemplary embodiment.

As illustrated in FIG. 1, the multi UI service system includes a display device 100 and a plurality of peripheral devices 200.

Here, the display device 100 is a terminal capable of performing data communication with the plurality of peripheral devices 200, and may be a terminal device such as a smart TV, a smart phone, a tablet PC, or a terminal device installed in a home appliance such as a washing machine, a refrigerator, or an air-conditioner. The display device 100 may be a terminal device which provides source information related to at least one region from among a plurality of regions constituting an execution screen of an application which is executed according to a user command to at least one peripheral device 200 from among the plurality of peripheral devices 200.

The plurality of peripheral devices 200 capable of data communication with the display device 100 may be the first to third peripheral devices 200-1 to 200-3 as shown in the drawings, and the first to third peripheral devices 200-1 to 200-3 may be a terminal device such as a smart TV, a smart phone, and a tablet PC, or a terminal device mounted in a home appliance such as a washing machine, a refrigerator, or an air conditioner.

At least one of the first to third peripheral devices 200-1 to 200-3 may display an execution screen or information corresponding to a specific area from among a plurality of areas constituting an execution screen of an application which is being executed by the display device 100 based on the source information received from the display device 100.

As described above, the display device 100 and the peripheral device 200 may be terminal devices such as a smart TV, a smart phone, a tablet PC, or a terminal device mounted in a home appliance such as a washing machine, a refrigerator, or an air conditioner. The display device 100 will be described in greater detail.

Figure 2:
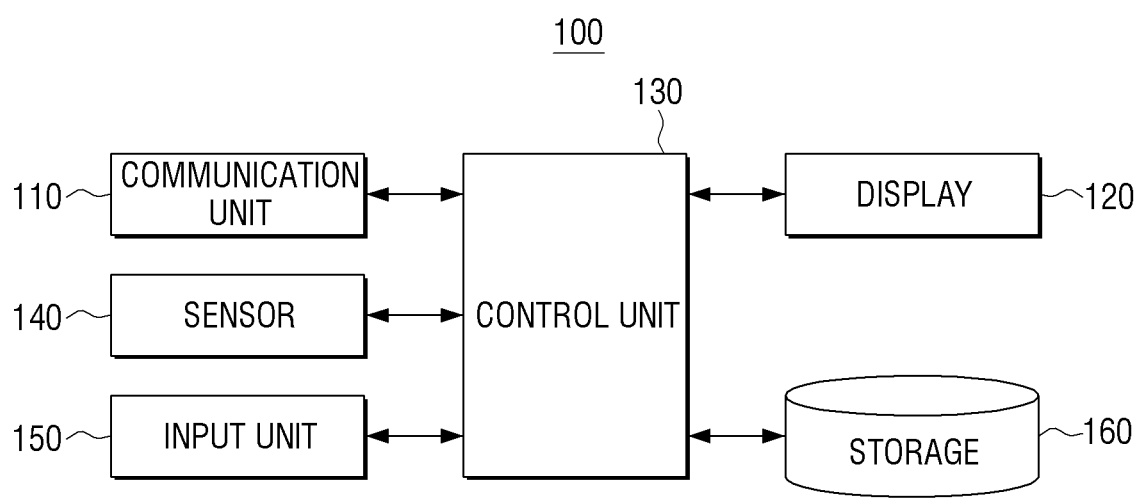
FIG. 2 is a block diagram briefly illustrating a configuration of a display device according to an exemplary embodiment.
Figure 3:
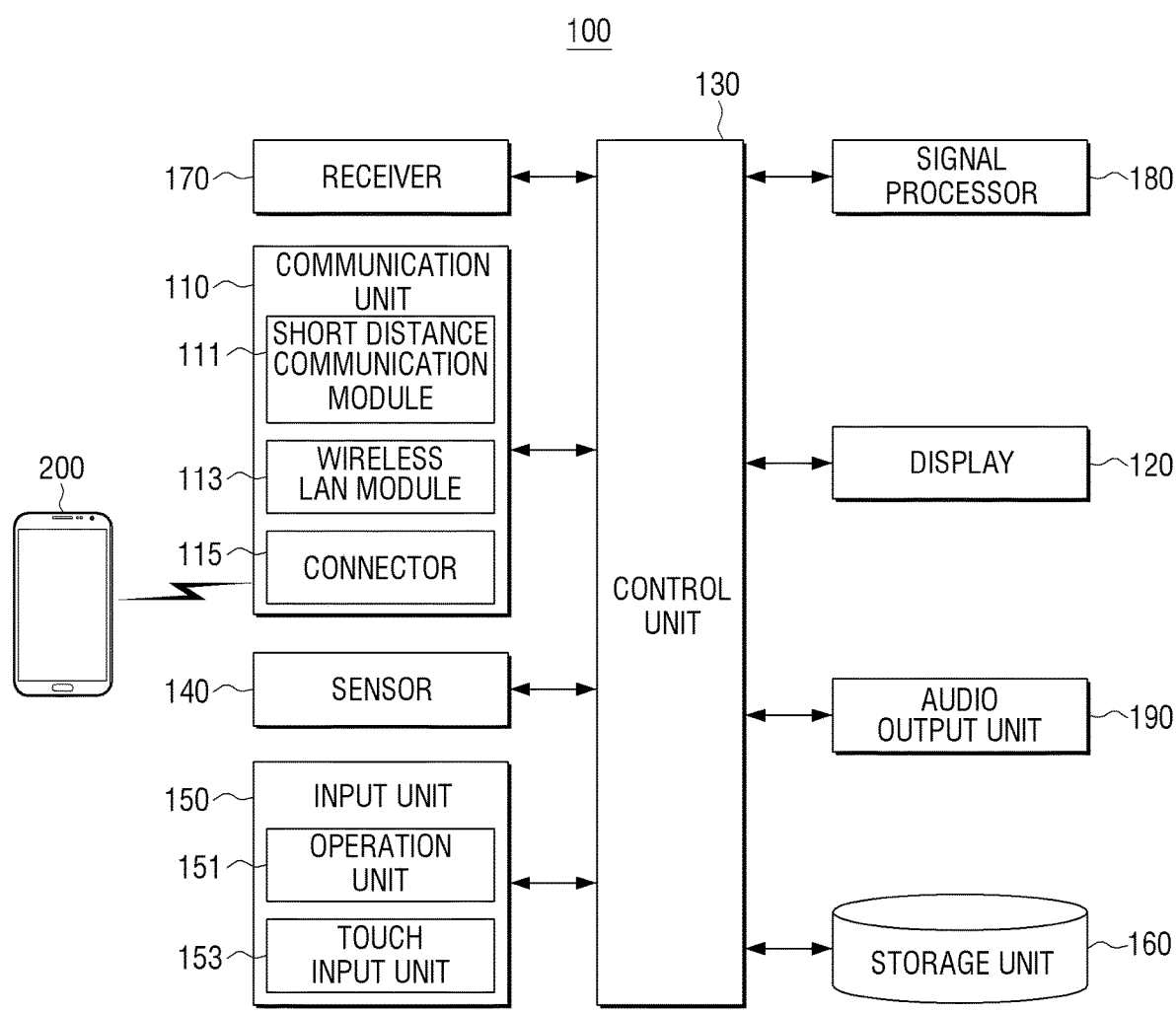
FIG. 3 is a block diagram illustrating a detailed configuration of a display device according to an exemplary embodiment.

FIG. 2 is a block diagram briefly illustrating a configuration of a display device according to an exemplary embodiment, FIG. 3 is a block diagram illustrating a detailed configuration of a display device according to an exemplary embodiment.

As described in FIG. 2, the display device 100 may include a communication unit 110, a display 120, a control unit 130, a sensor 140, an input unit 150, and a storage 160.

The communication unit 110 performs data communication with a plurality f peripheral devices 200 existing on the same network by wire/wireless. Accordingly, the communication unit 110 can transmit source information related to at least one of a plurality of areas constituting an execution screen of an application being executed to at least one peripheral device 200 among a plurality of peripheral devices 200 capable of data communication.

Here, the source information may include at least one of an execution code and a resource for execution of a first area to be transmitted to the peripheral device 200 among a plurality of areas constituting an execution screen of the application.

As illustrated in FIG. 3, the communication unit 110 which performs data communication with the plurality of peripheral devices 200 includes a short distance communication module 111, a wireless LAN module 113, a high-definition multimedia interface (HDMI), a universal serial bus (USB), and a connector 115 which includes at least one of wired communication module such as Institute of Electrical and Electronics Engineers (IEEE) 1394, and the like.

The short distance communication module 111 is a configuration for wirelessly performing short distance communication between the display device 100 and the plurality of peripheral devices 200. The short distance communication module 111 may include at least one of a Bluetooth module, a Near Field Communication (NFC) module, a WIFI module, and a Zigbee module.

The wireless LAN module 113 is a module that is connected to an external network and performs communication according to a wireless communication protocol such as IEEE. In addition, the wireless communication module may further include a mobile communication module for performing communication by accessing a mobile communication network according to various mobile communication standards such as 3rd Generation (3G), 3rd Generation Partnership Project (3GPP), Long Term Evolution (LTE), and so on.

The communication unit 110 may be implemented by various wireless communication methods, and can apply other communication technologies not mentioned in this specification, if necessary.

Meanwhile, the connector 115 is configured to provide an interface with various peripheral devices such as USB 2.0, USB 3.0, HDMI, and IEEE 1394. Such connector 115 may receive image content related data from a terminal device including a plurality of peripheral devices 200 through a cable connected to the connector 115 in accordance with a control command of the control unit 143. In addition, the connector 115 can receive power from a power source via a wired cable physically connected to the connector 115.

The display 120 may display an execution screen of an executed application according to a user command. In addition, the display 120 may display image content received from an external source such as a content server (not shown) and image processed by the control unit 130. The display 120 may be implemented as a liquid crystal display (LCD), an organic light emitting diode (OLED), or a plasma display panel (PDP). If the input unit 150 to be described later is implemented as a touch pad, the display 120 may be implemented as a touch screen having a mutual layer structure together with the input unit 150, which is a touch pad.

The control unit 130 controls the operation of each of the components constituting the display device 100. In particular, the control unit 130 extracts source information related to an area to be transmitted to the peripheral device 200 among the source information stored in the storage unit 160 in relation to a plurality of areas constituting an execution screen of the application. In accordance with such a control command, the communication unit 110 can transmit to the peripheral device 220 the source information pre-extracted by the peripheral device 220. Here, the peripheral device 200 may be a device which is in proximity to the display device 100 or selected according to a user command from among the plurality of peripheral devices 200 communicable with the display device 100. Accordingly, such peripheral device 200 can display an execution screen or information corresponding to a specific area among a plurality of areas constituting an execution screen of the application, based on the source information received from the display device 100.

The sensor 140 may be a proximity sensor that senses whether at least one of the plurality of peripheral devices 200 is in proximity to the peripheral device 100. The sensor 140 may be formed on one side of the display device 100 or on each side thereof.

As shown in FIG. 3, the input unit 150 includes an operation unit 151 for receiving a user's operation command, and a control unit 150 for receiving a user's touch command and a touch input unit 153 for receiving a user's touch command. Here, the operation unit 151 may be implemented as a keypad having various function keys, numeric keys, special keys, and character keys. The touch input unit 153, when the display 220 is implemented as a touch screen, may be a touch pad having a mutual layer structure with the display 220.

The storage unit 160 may store an application program for executing each of a plurality of applications. In addition, the storage unit 160 may store at least one of various multimedia data and contents processed by the control unit 130, and image contents received from an external source or generated according to a user command. Further, the storage unit 160 may store an operating system program for controlling the operation of the display device 100. Here, the operating program may be a program that is read and compiled in the storage unit 160 to operate each configuration of the display device 100 when the display device 100 is turned on. The storage unit 160 may be a ROM, a RAM or a memory card (e.g., an SD card or a memory stick) detachably mountable to the display device 100, a nonvolatile memory, a volatile memory, a hard disk drive (HDD) or a solid state drive (SSD).

As illustrated in FIG. 3, the display device 100 may further include a receiver 170, a signal processor 180, and an audio output unit 190.

The receiver 170 may include an IR receiver (not shown) receiving a user command transmitted from a remote control device (not shown) for controlling the operation of the display device 100. Specifically, the remote control device (not shown) may transmit a user command, such as a function setting of the display device 100, to the display device 100 through a control signal such as an IR signal or an RF signal. Accordingly, the receiver 170 can receive a user command such as a function setting of the display device 100 based on a control signal received through a remote control device (not shown) through an IR receiver (not shown). In addition, the receiver 170 may include a timer unit (not shown) for receiving a broadcast signal of a broadcast channel selected by a user from a plurality of image contents provided from a broadcast server (not shown). In this case, when the channel tuning command is inputted through the remote control unit (not shown), the receiver 170 may tune a channel corresponding to the channel selection command received from the remote control unit (not shown) through the tuner unit and receive the broadcast signal through the tuned channel.

The signal processing unit 180 processes the data received from the terminal device including the plurality of peripheral devices 200 through a broadcast signal of the broadcast channel received through the receiver 170 or the communication unit 110. In addition, the signal processing unit 180 may process the application-related contents executed in accordance with the user's command in a displayable form through the display 120.

The audio output unit 190 may output signal-processed audio data via speaker through the signal processing unit 180, and the display 120 may display the signal-processed video data on a screen through the signal processing unit 180.

As described above, when the peripheral device 200 adjacent to the display device 100 is detected through the sensor 140, or the peripheral device 200 corresponding to the user command input through the input unit 150 is selected, the control unit 130 can extract source information related to an area to be transmitted to the peripheral device 200 among a plurality of areas constituting an execution screen of the application, based on the following embodiment. Here, the source information may include at least one of an execution code and a resource for execution of an area to be transmitted to the peripheral device 200 among a plurality of areas constituting an execution screen of the application.

When the peripheral device 200 adjacent to the display device 100 is detected or selected, the control unit 130 may extract predetermined source information relating to an area to be transmitted to the peripheral device 200 from among a plurality of areas constituting an execution screen of an application.

According to another embodiment, when the peripheral device 200 adjacent to the display device 100 is detected or selected, the control unit 130 may analyze an execution code for executing an area to be transmitted to the peripheral device 200, from among a plurality of areas constituting an execution screen of an application, and extract source information relating to the area.

Figure 4:
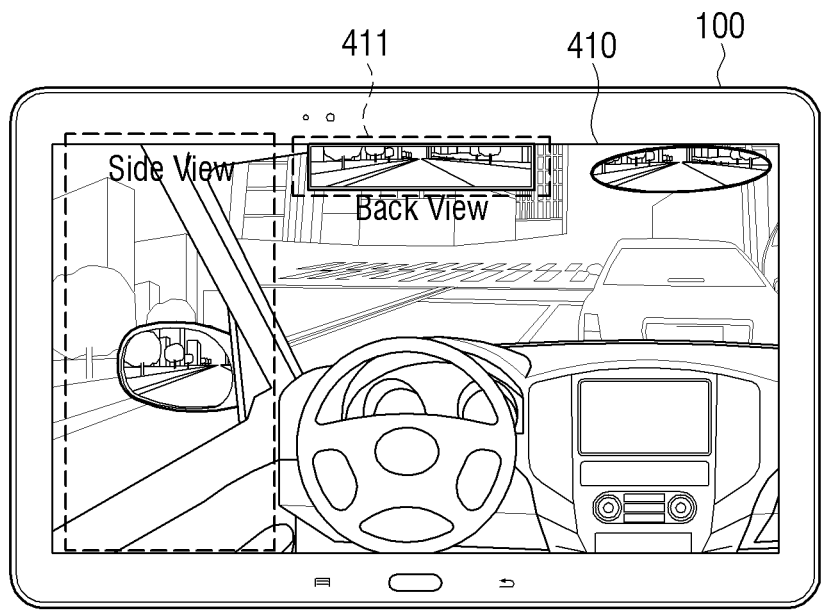
FIG. 4 is an exemplary diagram which extracts source information relating to an area to be transmitted to a peripheral device from among a plurality of areas constituting an execution screen of an application according to an exemplary embodiment.
Figure 4:
Figure 4:
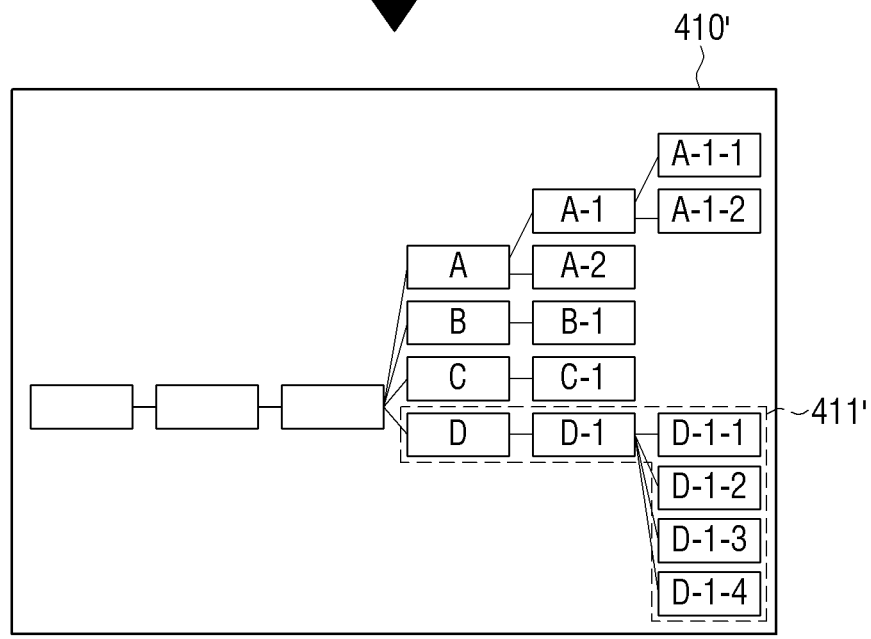

FIG. 4 is an exemplary diagram which extracts source information relating to an area to be transmitted to a peripheral device from among a plurality of areas constituting an execution screen of an application according to an exemplary embodiment.

As shown in FIG. 4A, the display device 100 may display an execution screen 410 of an application divided into a plurality of areas according to a user command. The execution screen 410 of such an application can be divided into a plurality of areas, and each area has a hierarchical structure as shown in FIG. 4(b). Specifically, each of the plurality of areas constituting the application execution screen 410 may be hierarchically configured with an execution code for executing each area and a resource associated with each execution code.

For example, as shown in FIG. 4A, the first area 411 of the plurality of areas constituting the application execution screen 410 may be located adjacent to the display device 100, or may be determined as an area to be executed in the selected peripheral device 200 according to a user command.

In this case, as shown in FIG. 4(b), the control unit 130 performs static/dynamic analysis with respect to an execution code corresponding to the first area 411, from among a plurality of areas, from an execution program to execute the execution screen 420 of the application. If the resource related to the execution code corresponding to the first region 411 is extracted based on the analyzed result, the control unit 130 may analyze the first area 411, an execution code corresponding to the first area 411, and a relationship with the resource extracted from the execution code, to extract source information 411' relating to the first area 411.

When the source information 411' for the first area 411 is extracted, the control unit 130 transmits the source information 411' extracted in relation to the first area 411 to the peripheral device 200. Accordingly, the peripheral device 200 can display the information of the first area 411 based on the source information 411' received from the display device 100.

The control unit 130 may determine an area to be transmitted to at least one peripheral device 200 from among a plurality of areas constituting an execution screen of an application based on the exemplary embodiment as shown below.

If the peripheral device 200 is detected to be proximate to the display device 100 through the at least one sensor 140, the control unit 130 may detect a position where the peripheral device 200 is proximate based on sensing information sensed from at least one sensor 140. The control unit 130 then extracts the source information of the first area related to the position where the peripheral device 200 is adjacent to the plurality of areas constituting the application execution screen and controls the communication unit 110 to transmit the source information to the peripheral device 200 adjacent to the display device 100. Accordingly, the communication unit 110 transmits the source information of the first area to the peripheral device 200 adjacent to the display device 100. The peripheral device 200 can generate an execution screen or information related to the first area based on the source information received from the display device 100 and display it on the screen.

According to another embodiment, when the peripheral device 200 is detected as being proximate to the display device 100 through the at least one sensor 140, the control unit 130 may request to the peripheral device 200 which is proximate to the display device 100 based on the detection information sensed through the at least one sensor 140.

Accordingly, when the device information is received from the peripheral device 200 adjacent to the display device 100, the control unit 130 controls the plurality of areas constituting the execution screen of the application based on the acquired device information of the peripheral device 200 and extract source information of the first area executable by the peripheral device 200 adjacent to the display device 100. Here, the device information may be specification information for data processing in the peripheral device 200.

The control unit 130 then controls the communication unit 110 to transmit the extracted source information to the peripheral device 200 adjacent to the display device 100. Accordingly, the communication unit 110 transmits the source information of the first area to the peripheral device 200 adjacent to the display device 100. Accordingly, the peripheral device 200 can generate an execution screen or information related to the first area based on the source information received from the display device 100 and display it on the screen.

According to another embodiment, when the peripheral device 200 is detected as being proximate to the display device 100 through the at least one sensor 140, the control unit 130 may transmit the device information to the peripheral device 200 which is adjacent to the display device 100 based on sensing information sensed through at least one sensor 140. Accordingly, when the device information is received from the peripheral device 200 adjacent to the display device 100, the control unit 130 extracts the source information of the first area executable in the peripheral device 200 adjacent to the display device 100 based on the device information of the peripheral device 200 and information of the plurality of areas constituting the execution of the application. Here, the device information may be specification information for data processing in the peripheral device 200.

The control unit 130 then controls the communication unit 110 to transmit the extracted source information to the peripheral device 200 adjacent to the display device 100. Accordingly, the communication unit 110 transmits the source information of the first area to the peripheral device 200 adjacent to the display device 100. Accordingly, the peripheral device 200 can generate an execution screen or information related to the first area based on the source information received from the display device 100 and display it on the screen.

According to another embodiment, the control unit 130 may analyze a plurality of areas constituting an execution screen of an application being executed and, based on the analysis result and the device information of the peripheral device 200 adjacent to the display device 100, may extract and transmit the source information of at least one area to the peripheral device 200 corresponding to the predetermined condition.

To be specific, if the first area of the plurality of areas constituting the execution screen of the application is an area for receiving a user command or an area for displaying user information, the control unit 130 may determine the first peripheral device 200-1 corresponding to the preset first condition as the device to which the source information of the first area is to be transmitted. For example, the first area among the plurality of areas constituting the execution screen of the application may be an area for receiving a simple user command of the user or displaying the personal information of the user. In this case, the control unit 130 controls the first peripheral device 200-1 of the small terminal such as the smart watch or the first peripheral device 200-1 of the peripheral device 200, which is adjacent to the display device 100, as the device to which the source information is to be transmitted.

As such, when the device to which the source information of the first area is to be transmitted is determined, the control unit 130 extracts the source information of the first area and transmits the extracted source information to the first peripheral device 200-1 and controls the communication unit 110 to transmit the data. Accordingly, the communication unit 110 transmits the source information of the first area to the first peripheral device 200-1 adjacent to the display device 100. Accordingly, the first peripheral device 20-10 may receive a user command related to the first area based on the source information received from the display device 100, or may generate and display a UT screen for providing user information.

On the other hand, if the second area of the plurality of areas constituting the application execution screen is an area for displaying contents, the control unit 130 controls the display unit 100 to display a content corresponding to a predetermined second condition among the peripheral devices 200 adjacent to the display device 100. The second peripheral device 200-2 can be determined as a device to transmit the source information of the second area. For example, the second area among the plurality of areas constituting the execution screen of the application may be an area for providing contents with a large amount of information. In this case, the control unit 130 can determine the second peripheral device 200-2 having a high specification for data processing among the peripheral devices 200 adjacent to the display device 100 as the device to transmit the source information of the second area.

As described above, when a device to transmit the source information of the second area is determined, the control unit 130 extracts the source information of the second area and transmits the extracted source information of the second area to the second peripheral device 200-2 and controls the communication unit 110 to transmit the data. Accordingly, the communication unit 110 transmits the source information of the second area to the second peripheral device 200-2 adjacent to the display device 100. Accordingly, the second peripheral device 20-10 can generate and display a content UI screen related to the second area based on the source information received from the display device 100.

According to another embodiment, the control unit 130 may generate at least one of the plurality of areas constituting the execution screen of the application, based on the user command inputted through the input unit 150. Here, the user command may include a first user command for one of a plurality of areas constituting an execution screen of an executing application, a second user command for a device to transmit source information of the selected area based on the first user command.

That is, when the first user command is inputted through the input unit 150, the control unit 130 extracts source information related to the first region corresponding to the first user command among the plurality of regions constituting the execution screen of the application. If the second user command is input through the input unit 150, the control unit 130 determines whether the first peripheral device 200 corresponding to the second user command among the plurality of peripheral devices 200 capable of communicating with the display device 100-1 to control the communication unit 110 to transmit the extracted source information in association with the first area. Accordingly, the communication unit 110 transmits the source information of the first area to the first peripheral device 200-1 corresponding to the command of the second user.

Therefore, the first peripheral device 200-1 may generate an execution screen or information relating to the first area based on source information received from the display device 100 and display on a screen.

In the present invention, description has been made on the case where the source information of the area corresponding to the first user command is extracted, and then the second user command for the peripheral device 200 to transmit the extracted source information is inputted. However, the input unit 150 can simultaneously receive the first and second user commands.

When the source information related to at least one of the plurality of areas constituting the execution screen of the application being executed is transmitted to at least one peripheral device 200, the execution screen of the application can be edited based on the remaining area excluding the area related to the source information, and the edited execution screen can be displayed.

For example, the application execution screen is divided into first to third areas, and the source information related to the first one of the first to third areas is transmitted to the peripheral device 200 adjacent to the display device 100. In this case, the control unit 130 can reconstruct and display an execution screen for the application based on the second and third areas except for the first area of the first to third areas.

Meanwhile, if it is detected that the execution screen return command is input or the peripheral device 200, to which the source information is transmitted, is not adjacent to the periphery of the display device 100, the control unit 130 may re-edit and display an execution screen of the edited application as an initial execution screen.

When an event for transmitting the source information related to the changed area to the peripheral device 200 occurs, the control unit 130 may re-edit the edited execution based on the remaining area excluding the changed area among the plurality of areas constituting the execution screen of the application and display the re-edited execution screen through the display 120.

For example, the peripheral device 200 adjacent to one side of the display device 100 may receive source information related to the first one of a plurality of areas constituting an execution screen of the application from the display device 100. The peripheral device 200 receiving the source information may move from one side to the other side of the display device 100 and cause a nearby event to occur. As such, when the peripheral device 200 is detected as being adjacent to the other side of the display device 100, the control unit 130 determines the position of the peripheral device 200 adjacent to the other side of the display device 100, extracts the source information of the second area related to the determined position, and transmits the extracted source information to the peripheral device 200. Thereafter, the control unit 130 re-edits the execution screen edited based on the remaining area excluding the second area among the plurality of areas constituting the execution screen of the application, and displays the execution screen re-edited through the display 120.

The peripheral device 200, which receives the source information related to the specific area among the plurality of areas constituting the execution screen of the application through the above—described various embodiments, may display information related to some of the areas of the display area. When the user command for application control is input in the state that the information is displayed, the peripheral device 200 transmits the inputted user command to the display device 100. Accordingly, the control unit 130 can control the operation of the application being executed based on the user command received from the peripheral device 200.

So far, various configurations of the display device 100 for providing the multi-UI service to the peripheral device 200 according to the present invention have been described in detail. Hereinafter, an area to be transmitted to the peripheral device 200 among a plurality of areas constituting an execution screen of an application in the display device 100 is determined, and an operation of executing the determined area in the peripheral device 200 will be described in detail.

Figure 5:
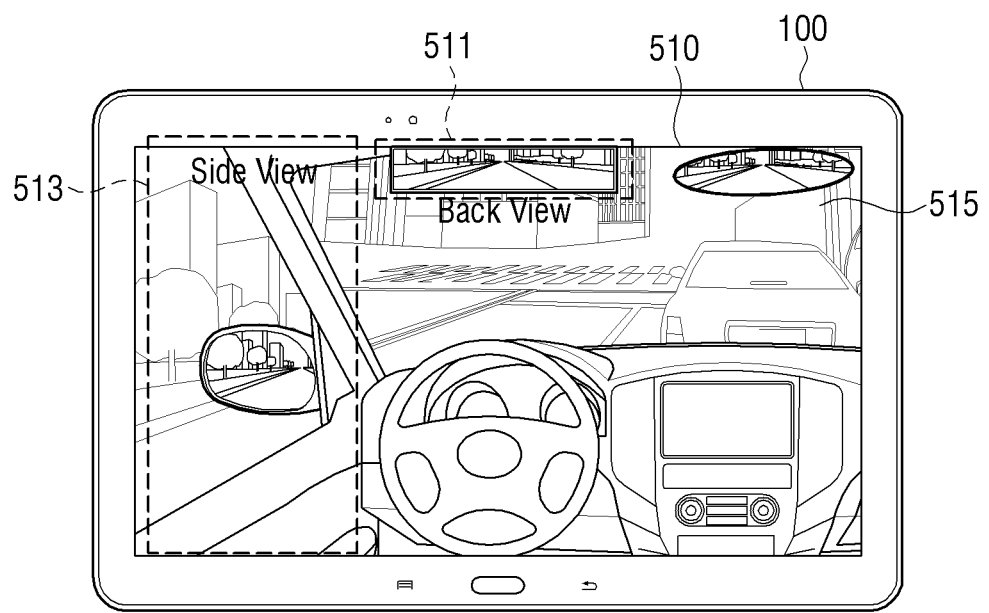
FIG. 5 is an exemplary diagram illustrating an execution screen of a display device according to an exemplary embodiment.

FIG. 5 is an exemplary diagram illustrating an execution screen of a display device according to an exemplary embodiment.

As shown in FIG. 5, the display device 100 may execute a selected application according to a user command and display an execution screen 510 of the executed application. As described above, the application execution screen 510 can be divided into a plurality of areas. Therefore, the display device 100 can display the application execution screen 510 by executing the respective areas based on at least one of the execution codes and resources for each area constituting the execution screen 410 of the application.

Specifically, the application execution screen 510 can be divided into first to third areas 511 to 515. In this case, the display device 100 may, based on an execution code corresponding to each of the first to third areas 511-515 constituting the execution screen 510 of the application and resources relating to each execution code, execute the first to third areas 511-515 and display the execution screen 410 of the application from the combination of the executed first to third areas 511-513.

Figure 6:
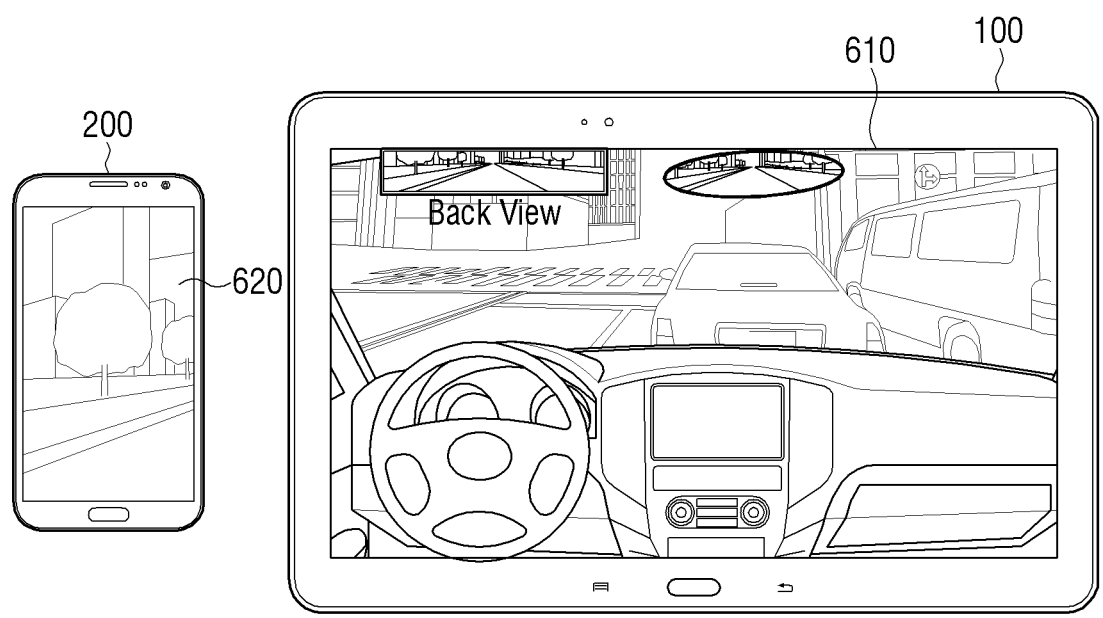
FIG. 6 is a first exemplary diagram performing a multi UI service between a display device and a peripheral device according to an exemplary embodiment.

FIG. 6 is a first exemplary diagram performing a multi UI service between a display device and a peripheral device according to an exemplary embodiment.

As illustrated in FIG. 5, the display device 100 may display an execution screen 510 of an application constituting of the first to third areas 511 to 515. Meanwhile, the peripheral device 200 may be adjacent to one side of the display device 100 displaying the execution screen 510 of the application.

As such, when the peripheral device 200 approaches to one side, the display device 100, based on the aforementioned various exemplary embodiments, may determine the second area 513 from among the first to third areas 511-515 constituting the execution screen 510 of the application as an area to be executed in the peripheral device 200. The display device 100 then extracts the source information of the second area 513 determined as an area to be executed by the peripheral device 200 close to one side of the display device 100 and transmits the extracted source information to the peripheral device 200 close to the display device 200. The peripheral device 200 adjacent to the display device 100 generates a UI screen 620 relating to the second area 510 from among the first to third areas 511-515 constituting the execution screen 510 of the application based on the source information received from the display device 100 and displays on the screen.

On the other hand, the display device 100, which has transmitted the source information related to the second area 513 to the peripheral device 200, may edit the execution screen 510 of the application based on source information of the remaining area excluding the second area 513 from among the first to third areas 511-515, that is, the first and third areas 511 and 515 and display the edited execution screen 610.

Figure 7:
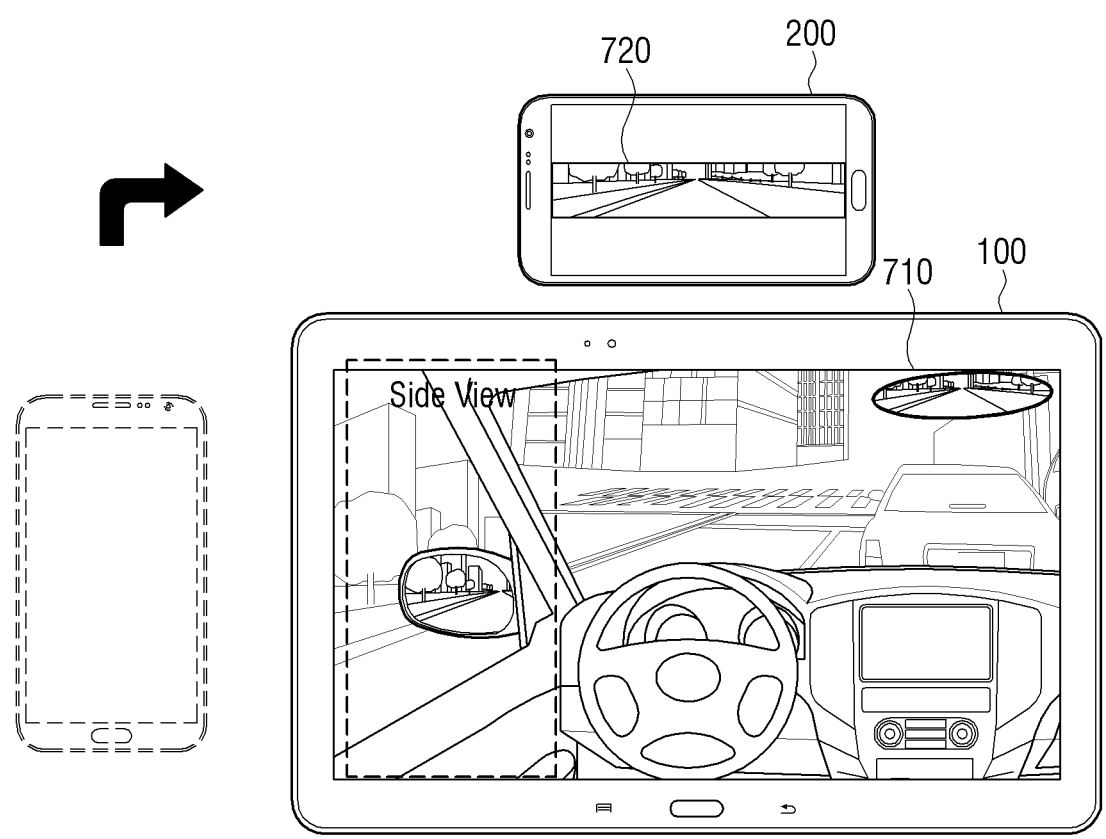
FIG. 7 is a second exemplary diagram performing a multi UI service between a display device and a peripheral device according to an exemplary embodiment.

FIG. 7 is a second exemplary diagram performing a multi UI service between a display device and a peripheral device according to an exemplary embodiment.

As illustrated in FIG. 6, the peripheral device 200 adjacent to one side of the display device 100 may generate and display an UI screen 620 relating to the second area 513 based on the source information of the second area 513 received from the display device 100. In this way, the peripheral device 200, which is positioned on one side of the display device 100 and displays the UI screen 620 related to the second area 513, can move to the other side of the display device 100.

As shown in FIG. 7, the peripheral device 200 located adjacent to the left side of the display device 100 may be positioned close to the upper side of the display device 100. As such, if the peripheral device 200 located close to the left side of the display device 100 is detected as being close to the upper side of the display device 100, the display device 100 can display, based on the various exemplary embodiments, may determine the first area 511 of the first to third areas 511 to 515 constituting the execution screen 510 as an area to be executed in the peripheral device 200 adjacent to the upper side of the display device 100. Then the display device 100 extracts source information of the first area 511 which is determined as an area to be executed in the peripheral device 200 adjacent to the upper side of the display device 100, and transmits the extracted source information to the peripheral device 200 adjacent to the upper side of the display device 100. Accordingly, the peripheral device 200 which is adjacent to the upper side of the display device 100 generates and displays a UI screen 720 relating to the first area 511 from among the first to third areas 511-515 constituting the execution screen 510 based on the source information received from the display device 100.

On the other hand, as described above, the display device 100 which is displaying the execution screen 610 of the edited application based on source information of the first and third areas 511, 515 excluding the second area 13 from among the first to third areas 511-515 constituting the execution screen 510 of the application, when source information relating to the first area 511 is transmitted to the peripheral device 200, may edit the execution screen 510 of the application based on the source information of the remaining second and third areas 513, 515 excluding the first area 511 from among the first to third areas 511-515 constituting the execution screen 510 of the application and display the edited execution screen 710.

Hereinafter, an operation of determining an area to be transmitted to a plurality of peripheral devices 200 among a plurality of areas constituting an execution screen of an application in the display device 100 and executing the determined area in a plurality of peripheral devices 200 will be described in a greater detail.

FIG. 8(*a*) is a first exemplary diagram of performing a multi UI service between a display device and a plurality of peripheral devices according to an exemplary embodiment.

As illustrated in FIG. 5, the display device 100 may display an execution screen 510 of an application configured by the first to third areas 511 to 515. Meanwhile, the first peripheral device 200-1 among the plurality of peripheral devices 200 that can communicate with each other may be close to the upper side of the display device 100 that displays the application execution screen 510. The display device 200-2 may be close to the left side of the display device 100 displaying the execution screen 510 of the application.

As described above, when the first and second peripheral devices 200-1 and 200-2 approach the upper side and the left side of the display device 100, the display device 100 can determine the first area 511 from among the first to third areas 511-515 constituting the execution screen 510 to be an area to be executed in the first peripheral device 200-1 adjacent to the upper side of the display device 100, and determine second area 513 as an area to be executed in the second peripheral device 200-2 adjacent to the left side of the display device 100.

As described above, when an area to be executed by each of the first and second peripheral devices 200-1 and 200-2 close to the display device 100 is determined, the display device 100 extracts source information of the first and second areas 511, 513 determined as an area to be executed in the first and second peripheral devices 200-1 and 200-2 adjacent to the display device 100. Then, the display device 100 transmits the source information of the first area to the first peripheral device 200-1 adjacent to the upper side, and transmits the source information of the second area to the second peripheral device 200-2 adjacent to the left side of the display device 100.

Accordingly, the first peripheral device 200-1 close to the upper side of the display device generates a UI screen 820 related to the first area 511 from among the first to third areas 511-515 constituting the execution screen 510 of the application based on the source information received from the display device 100 and displays the UI screen on a screen. In addition, the second peripheral device 200-2 adjacent to a left side of the display device 100, based on the source information received from the display device 100, generates a UI screen 830 relating to the second area 513 from among the first to third areas 511-515 constituting the execution screen 510 of the application and displays on the screen.

On the other hand, the display device 100, which has transmitted the source information related to the first and second areas 511 and 513 to the first and second peripheral devices 200-1 and 200-2, may edit the execution screen 510 of the application based on the source information of the third area 515, which is the remaining area excluding the first and second areas 511, 513 from among the first to third areas 511-515 and display the edited execution screen 810.

Figure 8A:
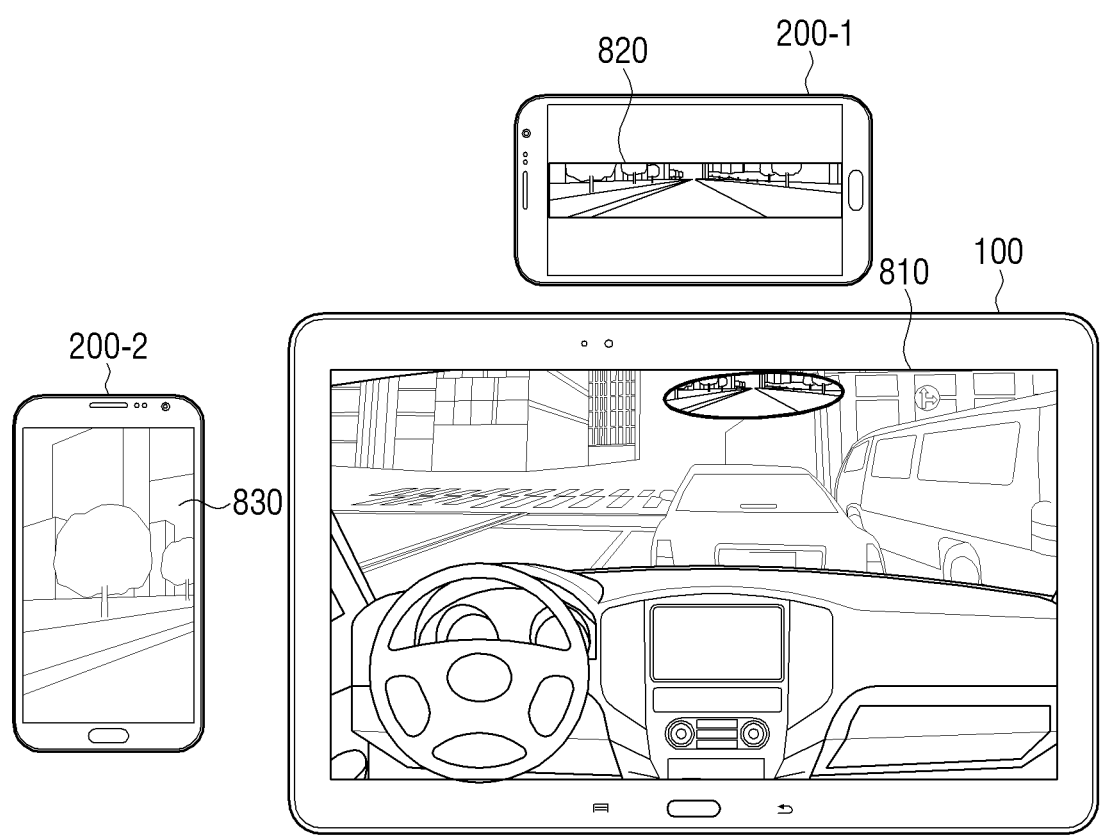
FIG. 8(a) is a first exemplary diagram of performing a multi UI service between a display device and a plurality of peripheral devices according to an exemplary embodiment.
Figure 8B:
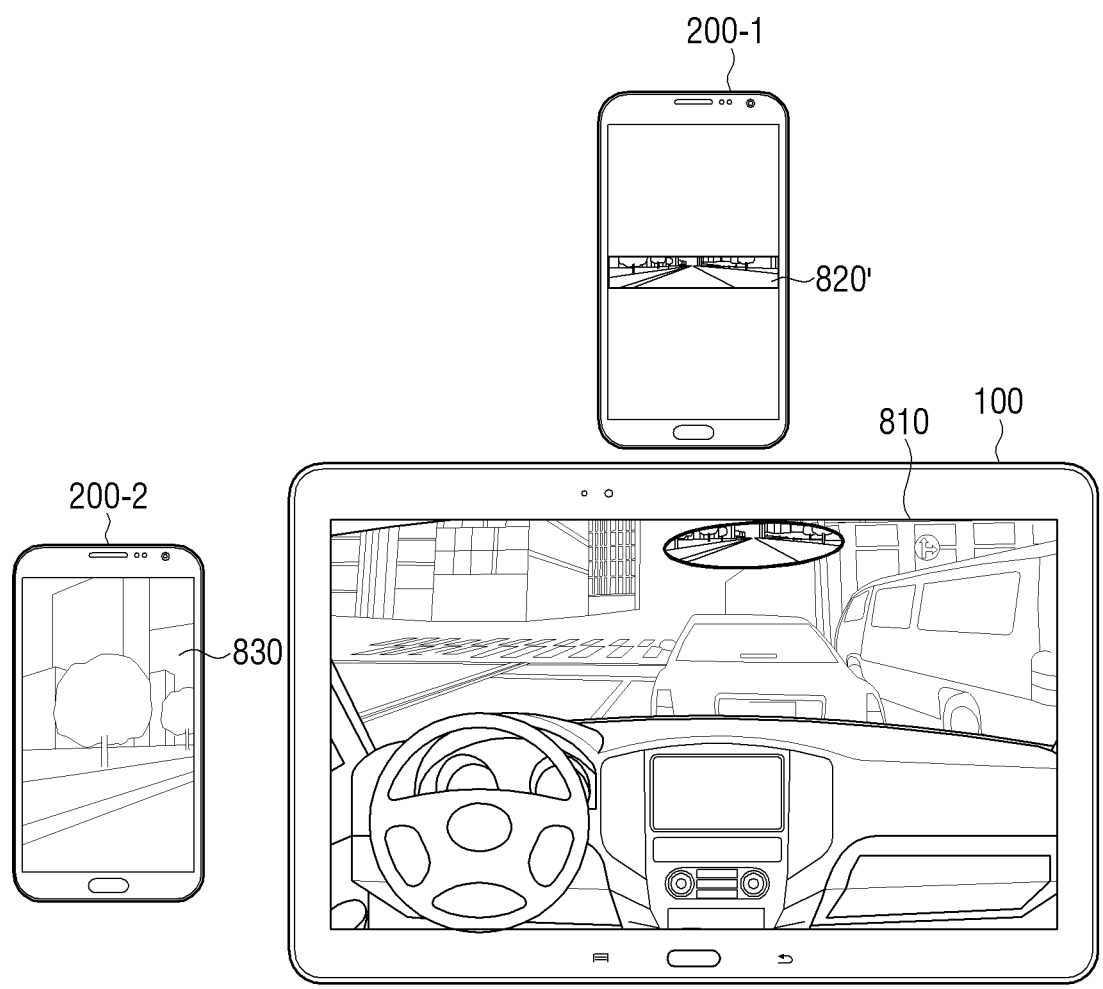
FIG. 8(b) is a first exemplary diagram of performing an operation corresponding to an event by a plurality of peripheral devices performing a multi UI service with the display device according to an exemplary embodiment.

FIG. 8(b) is a first exemplary diagram of performing an operation corresponding to an event by a plurality of peripheral devices performing a multi UI service with the display device according to an exemplary embodiment.

As illustrated in FIG. 8(a), the first peripheral device 200-1 close to the upper side of the display device generates a UI screen 820 related to the first area 511 based on the source information received from the display device 100 and displays the UI screen. In addition, the second peripheral device 200-2 adjacent to a left side of the display device 100 may display the UI screen 830 relating to the second area 513 based on the source information received from the display device 100.

As illustrated in FIG. 8(b), when the first peripheral device 200-1 displaying the UI screen 820 related to the first area 511, if a screen switching even occurs according to a user manipulation, may rotate the UI screen 820 in a direction corresponding to the screen switching event and display the rotated UI screen 820'.

That is, the first peripheral device 200-1 located in the vertical direction (horizontal direction) with respect to the center axis of the first peripheral device 200-1 can be located in a horizontal direction (length direction) according to a user manipulation. In this case, the first peripheral device 200-1 can switch the UI screen 820 generated in the horizontal direction to the UI screen 820' corresponding to the vertical direction and display the UI screen 820'.

Figure 8C:
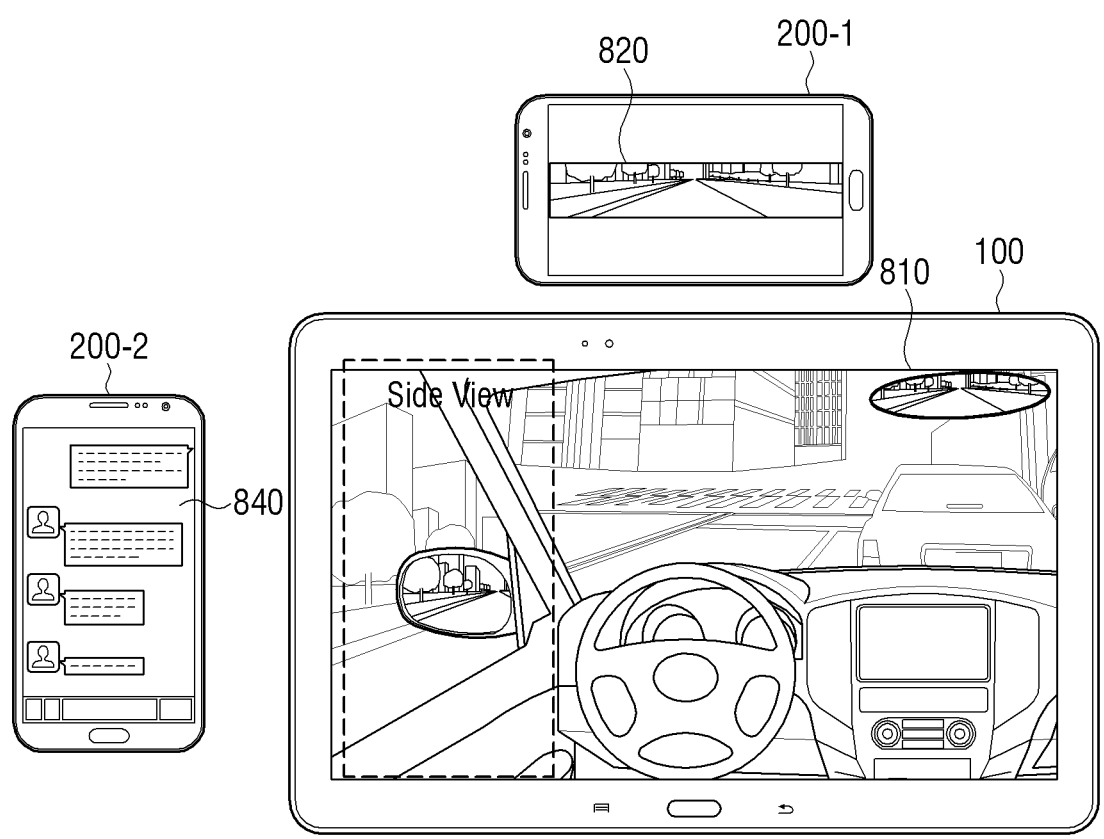
FIG. 8(c) is a second exemplary diagram of performing an operation corresponding to an event by a plurality of peripheral devices performing a multi UI service with the display device according to an exemplary embodiment.

FIG. 8(c) is a second exemplary diagram of performing an operation corresponding to an event by a plurality of peripheral devices performing a multi UI service with the display device according to an exemplary embodiment.

As illustrated in FIG. 8(a), the first peripheral device 200-1 close to the upper side of the display device generates a UI screen 820 related to the first area 511 based on the source information received from the display device 100 and displays the UI screen. In addition, the second peripheral device 200-2 adjacent to a left side of the display device 100 may display the UI screen 830 relating to the second area 513 based on the source information received from the display device 100.

As illustrated in FIG. 8(c), the second peripheral device 200-2, which displays the UI screen 830 related to the second area 513, when an event to receive a message through social network services (SNS) occurs, may switch the currently-display UI screen 830 to a community UI screen 840 for providing a social network service and display the screen.

However, the present invention is not limited thereto, and the second peripheral device 200-2, which displays the UI screen 830 related to the second area 513, when an event to receive a message through SNS occurs, may overlap and display the community UI screen 840 for providing a social network service on the displayed UI screen 830.

However, the present invention is not limited thereto, and the second peripheral device 200-2, which displays the UI screen 830 related to the second area 513, when an event to receive a message through SNS occurs, may display the UI screen 830 relating to the second area 513 and provide a notification service indicating that a message is received.

Figure 9:
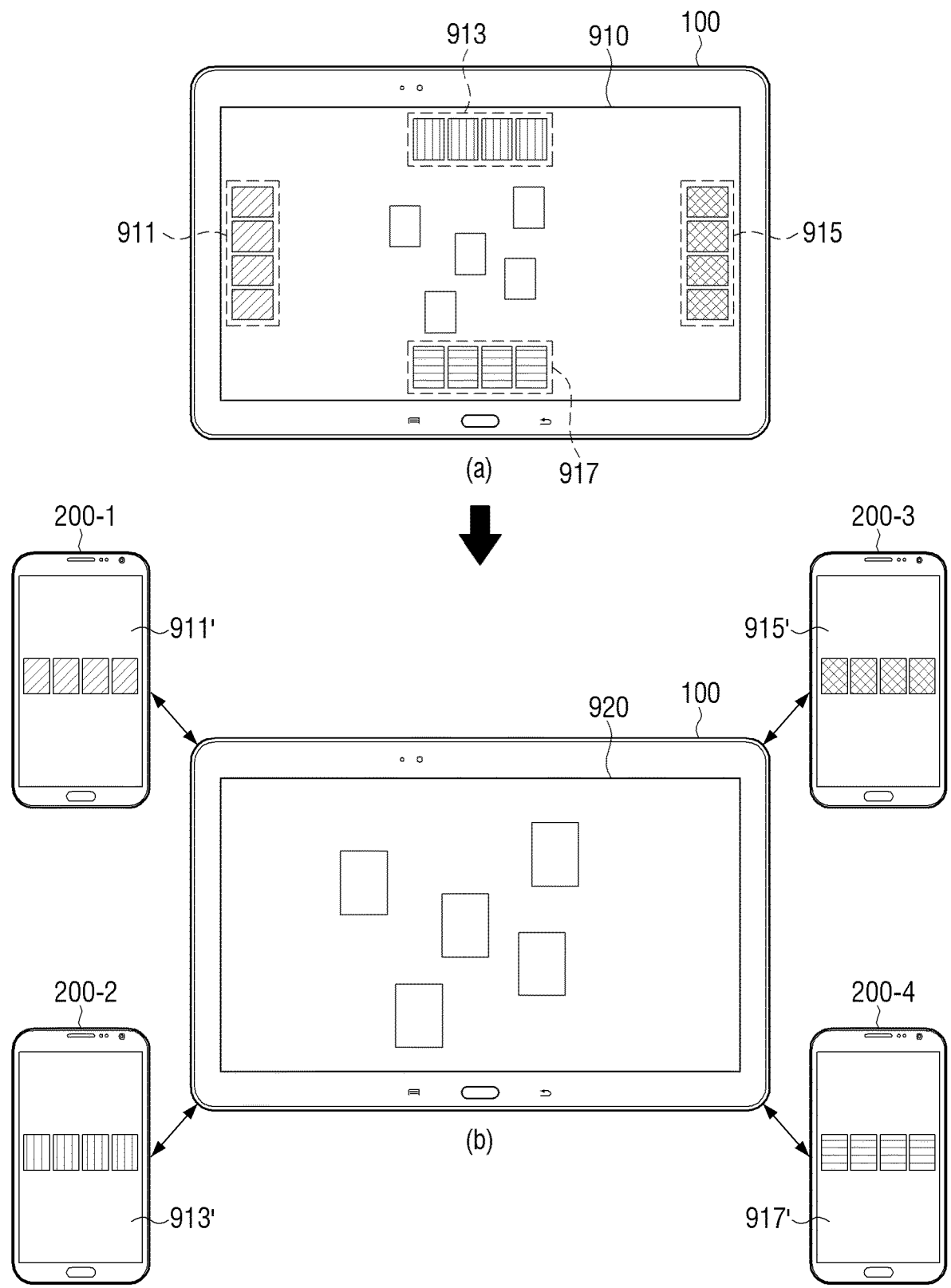
FIG. 9 is a second exemplary diagram of performing a multi UI service between a display device and a plurality of peripheral devices according to an exemplary embodiment according to an exemplary embodiment.

FIG. 9 is a second exemplary diagram of performing a multi UI service between a display device and a plurality of peripheral devices according to an exemplary embodiment according to an exemplary embodiment.

As illustrated in FIG. 9(a), the display device 100 can execute a card game related application according to a user command, display an execution screen 910 for the executed application. Around the display device 100, there may be first to fourth peripheral devices 200-1 to 200-4.

On the other hand, the display device 100, while the execution screen 910 regarding a card game application is displayed, may receive a selection command to each object 911-917 included in the execution screen 910 and a selection command to the peripheral devices 200-1 to 200-4 on which the UI screen corresponding to each object is to be displayed.

Specifically, from among the plurality of objects 911-917 included in the execution screen 910 with respect to the card game application, a user command with respect to the first object 911 and the first peripheral device 200-1 to provide a UI service relating to the first object 911 is input, the display device 100, based on the input user command, extracts source information of the first area relating to the first object 911 and transmits the information to the first peripheral device 200-1. When a user command with respect to the second object 913 and a second peripheral device 200-2 to provide a UI service relating to the second object is input, the display device 100, based on the input user command, extracts source information of the second area relating to the second object 913 and transmits the information to the second peripheral device 200-2. When a user command with respect to the third object 915 and a third peripheral device 200-3 to provide a UI service relating to the third object is input, the display device 100, based on the input user command, extracts source information of the third area relating to the third object 915 and transmits the information to the third peripheral device 200-3. Finally, when a user command with respect to the fourth object 917 and a fourth peripheral device 200-4 to provide a UI service relating to the fourth object is input, the display device 100, based on the input user command, extracts source information of the third area relating to the fourth object 917 and transmits the information to the fourth peripheral device 200-4.

However, the present invention is not limited thereto, and the display device 100 may determine an object to be transmitted to the first to fourth peripheral devices 200-1-200-4 from among the plurality of objects 911-917 based on each position of the first to the fourth peripheral devices 200-1 to 100-4 adjacent to the display device 100.

For example, the first and fourth peripheral devices 200-1 and 200-4 may be close to the upper and lower sides of the display device 100, and the second and third peripheral devices 200-2 and 200-3 may adjacent to the left side and right side of the display device 100. In this case, the display device 100 may, considering the adjacent position of the first to fourth peripheral devices 200-1, 200-2, may extract and transmit source information of the first and fourth areas relating to the first and fourth objects 911, 917 to the first and fourth peripheral devices 200-1, 200-4 adjacent to an upper side and a lower side. The display device 100 may extract and transmit source information of the second and third areas relating to the second and third objects 913, 917 to the second and third peripheral devices 200-2 and 200-3 adjacent to the left side and right side.

Thus, as shown in FIG. 9(b), the first and second peripheral devices 200-1 and 200-2 can display the UI screens 911' and 913' corresponding to the first and second objects 911, 913 based on the source information received from the display device 100. The third and fourth peripheral devices 200-3 and 200-4 may display UI screens 915' and 917' corresponding to the third and fourth objects 915 and 917, respectively, based on the source information received from the display device 100.

On the other hand, the display device 100, which has transmitted the source information for each of the first to fourth objects 911 to 917 to the first to fourth peripheral devices 200-1 to 200-4, may edit an execution screen 910 regarding an application based on the fifth area excluding the first to fourth objects 911-917 relating to the first to fourth areas from among the first to fifth areas constituting the execution screen 910 and display the edited execution screen 920.

Based on the source information received from the display device 100, when a user command relating to the UI screen 911' is received from the first peripheral device 200-1 from among the first to fourth peripheral devices 200-1 to 200-4 displaying the UI screens 911'-917' corresponding to the first to fourth objects 911-917, the input user command is transmitted to the display device 100. When a user command is received from the first peripheral device 200-1, the display device 100 may re-edit and display the displayed execution screen 920 based on the received user command.

Figure 10:
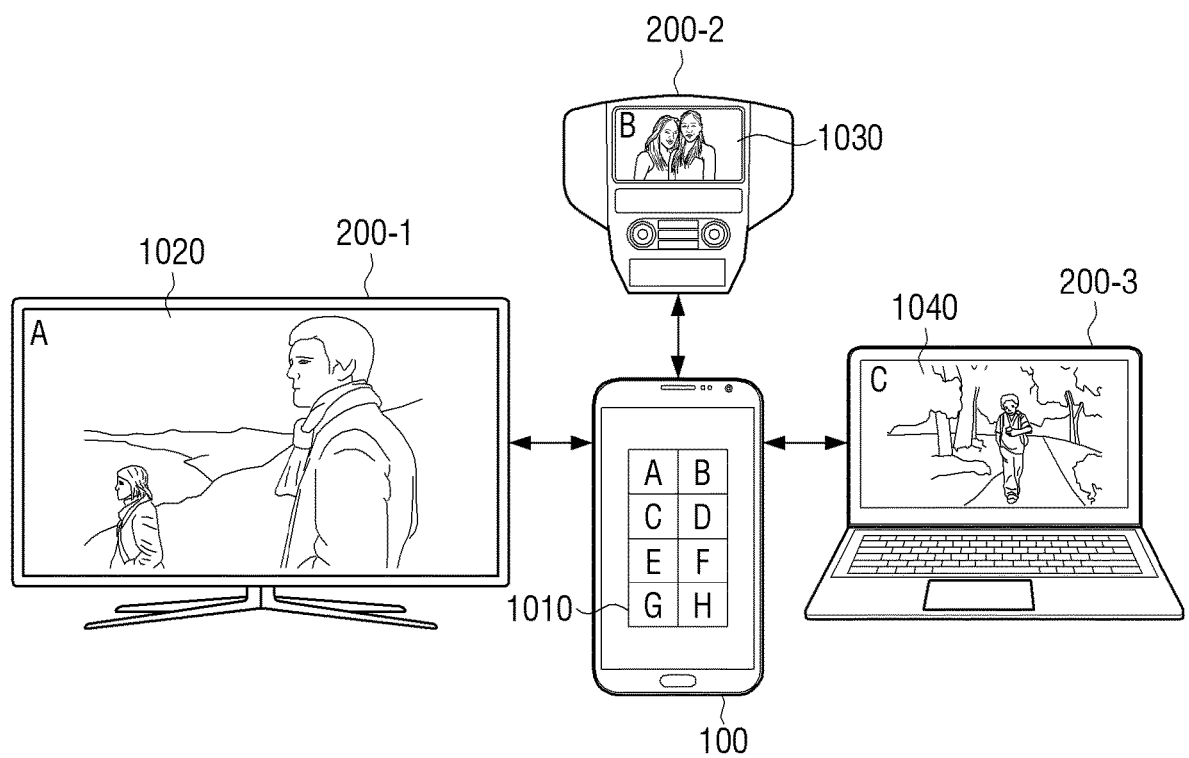
FIG. 10 is a third exemplary diagram of performing a multi UI service between a display device and a plurality of peripheral devices according to an exemplary embodiment according to an exemplary embodiment.

FIG. 10 is a third exemplary diagram of performing a multi UI service between a display device and a plurality of peripheral devices according to an exemplary embodiment according to an exemplary embodiment.

As shown in FIG. 10, the display device 100 may display a content list UI 1010 including a thumbnail image for identifying each of a plurality of contents on a screen. In the state where the content list UI 1010 is displayed, the display device 100 may transmit the content source information corresponding to the thumbnail image included in the content list UI 1010 to at least one peripheral device 200 among a plurality of peripheral devices 200 capable of communicating based on a user command.

As illustrated, the content list UI 1010 displayed on the screen of the display device 100 may include A to H thumbnail images and the peripheral device 200 capable of communicating with the display device 100 may be a Smart TV, vehicle-mounted navigation and a notebook. On the other handy the user may request that the content corresponding to the A thumbnail image from the content list UI 1010 displayed on the screen of the display device 100 is displayed on the smart TV as the first peripheral device 200-1, and the content corresponding to the B thumbnail image is displayed on a navigation which is the second peripheral device 200-2, and the content corresponding to the C thumbnail image is displayed in a notebook, which is the third device 200-3.

In response to the request, the display device 100 extracts source information related to the A thumbnail image among the plurality of thumbnail images included in the content list UI 1010 displayed on the screen and transmits to the first peripheral device 200-1, extracts source information related to B thumbnail image and transmits to the second peripheral device 200-2, and extracts source information related to the C thumbnail image and transmits to the third peripheral device 200-3.

Accordingly, the smart TV as the first peripheral device 200-1 displays the A content 1020 related to the A thumbnail image based on the source information received from the display device 100, and the second peripheral device 200-2 can display B content 1030 related to the B thumbnail image based on the source information received from the display device 100. The notebook, which is the third peripheral device 200-2, can display the C content 1040 related to the C thumbnail image on the screen based on the source information received from the display device 100.

Figure 11:
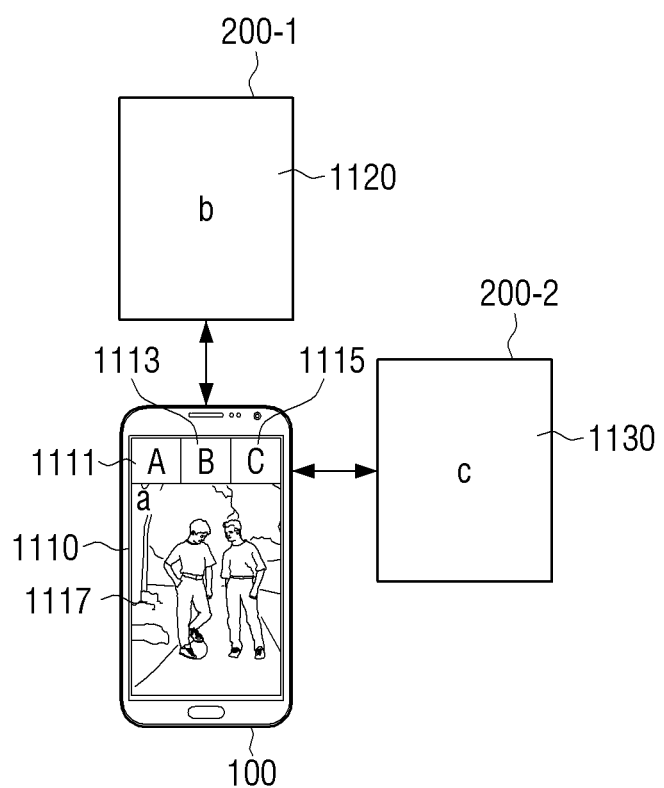
FIG. 11 is a fourth exemplary diagram of performing a multi UI service between a display device and a plurality of peripheral devices according to an exemplary embodiment according to an exemplary embodiment.

FIG. 11 is a fourth exemplary diagram of performing a multi UI service between a display device and a plurality of peripheral devices according to an exemplary embodiment according to an exemplary embodiment.

As illustrated in FIG. 11, the display device 100 can display an execution screen 1110 of an application in the form of a tab view, and a plurality of areas constituting an execution screen 1110 of an application may include the first to third areas 1111-1115 for displaying A to C tabs and the fourth area 1117 for displaying a selected tab among A to C tabs.

As illustrated, the display device 100 for displaying the execution screen 1110 of the application of the tab view type, when a selection command for the step A among the A to C tabs is inputted, may display A content relating to A Lib on the fourth area 1117.

Meanwhile, the user may request that the b content 1120 relating to B tab is displayed on the first peripheral device 200-1 adjacent to the display device 100 from the execution screen 1110 of the application in a tab view format displayed on a screen of the display device 100 and display C content 1130 relating to C tab on the second peripheral device 200-2.

In response to such request, the display device 100 extracts the source information associated with the second area 1113 displaying the B tab and transmits the information to the first peripheral device 200-1, and extracts the source information related to the third area 1115 displaying C tab, and transmits the extracted source information to the second peripheral device 200-2.

Accordingly, the first peripheral device 200-1 can display, on the screen, the b content 1120 to be executed at the time of the selection command for the B tab, based on the source information received from the display device 100. The second peripheral device 200-2 can display on the screen the c content 1130 to be executed at the time of a selection command for the C tab based on the source information received from the display device 100.

Figure 12:
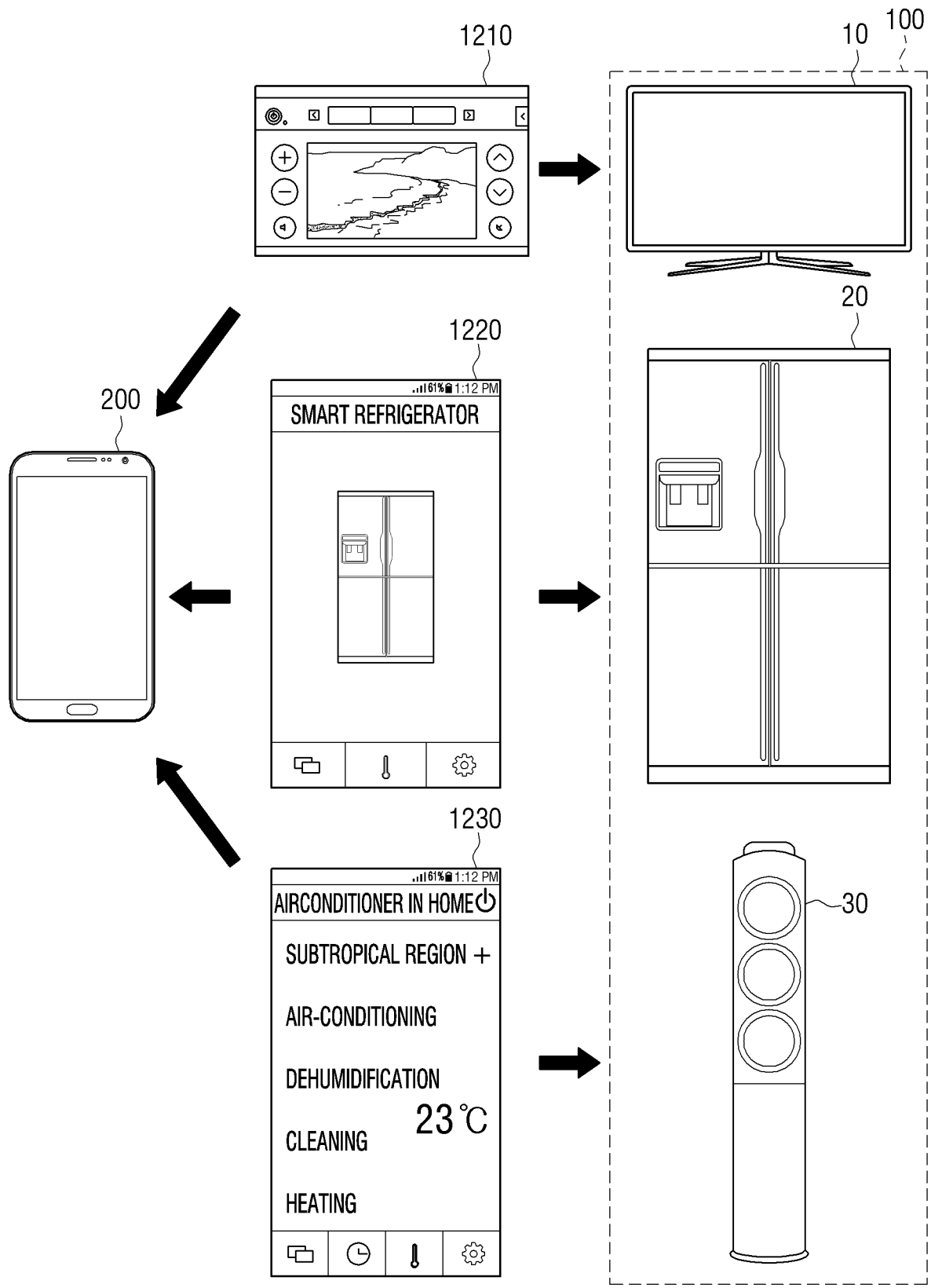
FIG. 12 is a fourth exemplary diagram of performing a multi UI service between a display device and a plurality of peripheral devices according to an exemplary embodiment according to an exemplary embodiment.

FIG. 12 is a fourth exemplary diagram of performing a multi UI service between a display device and a plurality of peripheral devices according to an exemplary embodiment according to an exemplary embodiment.

As illustrated in FIG. 12, according to an exemplary embodiment, the display device 100 and the peripheral device 200 mounted on the home appliance such as the smart TV 10, the smart refrigerator 20, and the smart air conditioner 30 may be connected to each other, when the peripheral device 200 approaches within a predetermined threshold distance, and may transmit source information relating to control UI for controlling the operation of the display device 100 to the peripheral device 200.

More specifically, when the display device 100 mounted in the smart TV 10 detects that the peripheral device 200 is within a predetermined threshold distance, the display device 100 extracts source information for controlling the TV function of the smart TV 10, and transmits the extracted source information to the peripheral device 200. Accordingly, the peripheral device 200 can generate a control UI 1210 for controlling the TV function of the smart TV 10 based on the source information received from the small TV 10, and display the control UI 1210 on the screen.

The display device 100 mounted in the smart refrigerator 20 extracts source information for controlling the refrigeration function of the smart refrigerator 20 when it is detected that the peripheral device 200 is within a predetermined threshold distance, and transmits the extracted source information to the peripheral device 200. Accordingly, the peripheral device 200 can generate the control UI 1220 for controlling the refrigeration function of the smart refrigerator 20 based on the source information received from the smart refrigerator 20, and display the control Uri 1220 on the screen.

The display device 100 installed in the smart air conditioner 30 extracts source information for controlling the air conditioner function of the smart air conditioner 30 when the peripheral device 200 is detected to be within a predetermined threshold distance, and transmits the extracted source information to the peripheral device 200. Accordingly, the peripheral device 200 can generate and display a control UI 1230 for controlling the air conditioner function of the smart air conditioner 30 based on the source information received from the smart air conditioner 30.

According to another embodiment, the peripheral device 200 may be installed in each of the smart TV 10, the smart refrigerator 20 and the smart air conditioner 30 to execute an execution program of the display device 100 for controlling the operation of each home appliance, and such an executable program may be periodically updated and stored in the peripheral device 200.

Accordingly, if it is determined that the peripheral device 200 is located within a predetermined threshold distance from at least one of the smart TV 10, the smart, refrigerator 20, and the smart air conditioner 30, and is connected to the display device 100 mounted on the home appliance, the peripheral deice 200 may transmit the source information related to the updated execution program to the display device 100 mounted in the nearby home appliance. Therefore, the display device 100 mounted in the home appliance such as the smart TV 10, the smart refrigerator 20 and the smart air conditioner 30 update a pre-installed execution program to the latest version on the basis of the source information received from the peripheral device 200.

Hereinafter, a method for controlling an operation of the display device 100 which performs a multi UI service with at least one peripheral device 200 according to the present invention will be described in detail.

Figure 13:
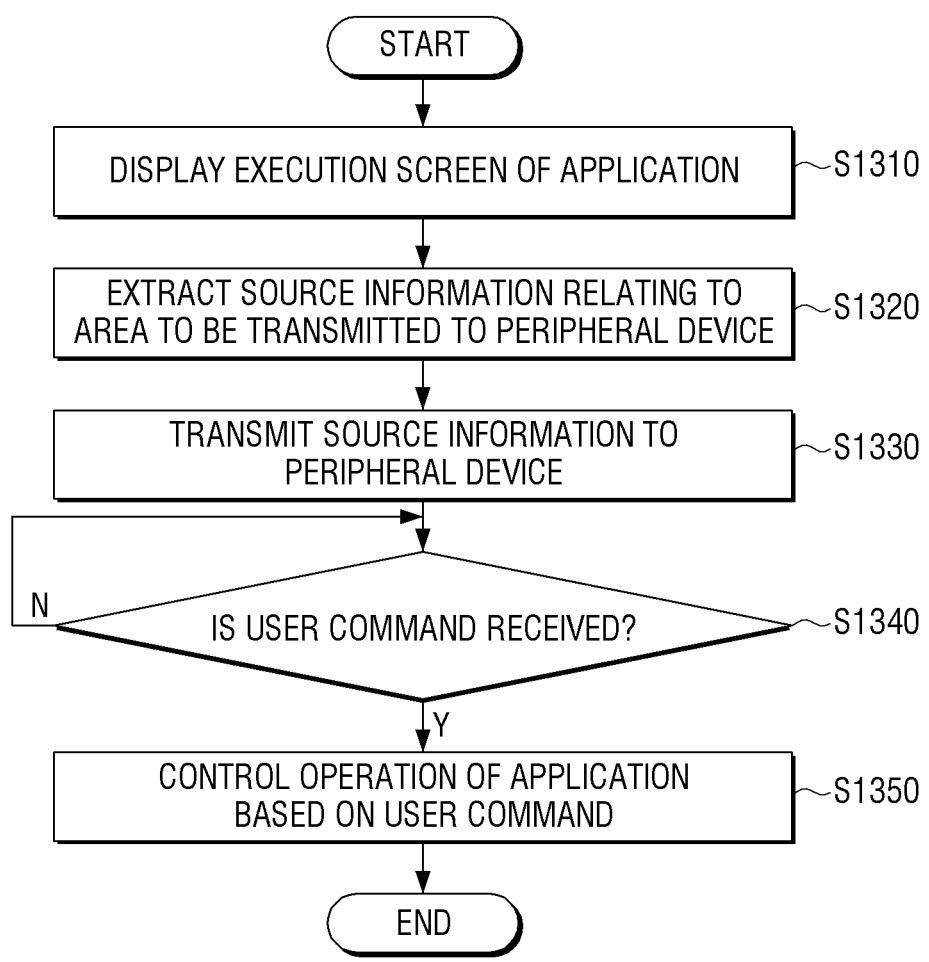
FIG. 13 is a first flowchart of a controlling method of a display device according to an exemplary embodiment.

FIG. 13 is a first flowchart of a controlling method of a display device according to an exemplary embodiment.

As illustrated in FIG. 13, the display device 100 displays an execution screen of an application requested by a user according to a user command (S1310). Here, the application execution screen may be a UT screen divided into a plurality of areas.

When the execution screen of the application divided into the plurality of areas is displayed, the display device 100 extracts the source information related to the area to be transmitted to the peripheral device among the plurality of areas constituting the execution screen of the application (S1320). Here, the source information may include at least one of an execution code and a resource for execution of an area to be transmitted to the peripheral device 200 among a plurality of areas constituting an execution screen of the application.

When the source information is extracted, the display device 100 transmits the extracted source information to the peripheral device 200 (S1330). Accordingly, the peripheral device 200 can display information on an area related to the received source information among a plurality of areas constituting an execution screen of the application, based on the source information received from the display device 100.

According to one embodiment, when at least one of the plurality of peripheral devices 200 is adjacent to the display device 100, the display device 100 determines the position of the adjacent peripheral device 200. Then, the display device 100 extracts the source information of the first area related to the position of the peripheral device 200 among the plurality of areas constituting the execution screen of the application, and displays the source information of the extracted first area on the display device 100 to the adjacent peripheral device 200. Accordingly, the peripheral device 200 can display information related to the first area based on the source information received from the display device 100.

According to another embodiment, when at least one peripheral device 200 of a plurality of peripheral devices 200 is adjacent to the display device 100, the display device 100 displays the peripheral device 200 on the basis of the device information of the peripheral device 200. The device may extract the source information of the first area that can be executed in the peripheral device 200 and transmit the extracted source information to the peripheral device 200. Accordingly, the peripheral device 200 can display information related to the first area based on the source information received from the display device 100.

According to still another embodiment, when at least one of the peripheral devices 200 of the plurality of peripheral devices 200 is adjacent to the display device 100, based on the device information of the adjacent peripheral device 200 and execution information of each of the plurality of peripheral devices 200, the display device 100 extracts the source information of the executable area in the peripheral device 200 adjacent to the display device 100 based on the information. Then, the display device 100 can transmit the extracted source information to the peripheral device 200 adjacent to the display device 100.

At this time, if the first area of the plurality of areas constituting the execution screen of the application receives the user command or receives the user information, the display device 100 may transmit the source information of the first area to the first peripheral device 200-1 corresponding to the preset first condition.

Meanwhile, if the second area among the plurality of areas constituting the application execution screen is an area for displaying contents, the display device 100 may transmit source information of the second area to the second peripheral device 200-2 corresponding to a preset second condition from among the peripheral device 200 adjacent to the display device 100.

According to still another embodiment, the display device 100 can extract source information of a first area corresponding to a user command among a plurality of areas constituting an execution screen of an application. When the source information of the first area is extracted, the display device 100 can transmit the source information of the first area to the peripheral device 200 corresponding to the user command among the communicable peripheral devices 200.

Meanwhile, the display device 100 determines whether a user command is received from the peripheral device 200 that has transmitted the extracted source information through the above-described various embodiments (S1340). As a result of the determination, when a user command is received from the peripheral device 200 that has transmitted the source information, the display device 100 controls the operation of the application being executed based on the user command received from the peripheral device 200 (S1350).

To be specific, the peripheral device 200 which receives source information relating to a specific area from among a plurality of areas constituting an execution screen of an application may display information relating to a part of an area from among a plurality of areas constituting an execution screen of an application based on the received source information. While the information is displayed, when a user command for controlling an application is input, the peripheral device 200 transmits the input user command to the display device 100. Accordingly, the display device 100 may control an operation of an operating application based on the user command received from the peripheral device 200.

Figure 14:
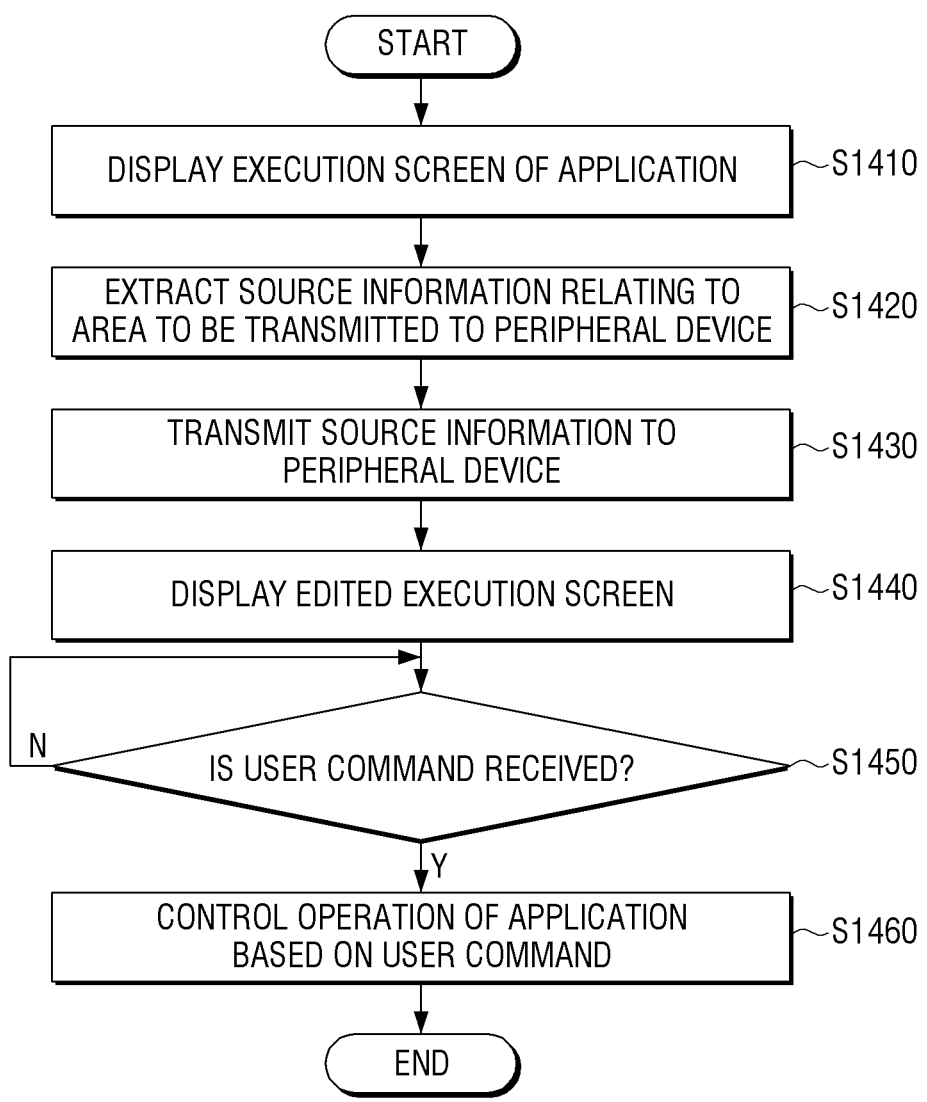
FIG. 14 is a second flowchart of a controlling method of a display device according to still another exemplary embodiment.

FIG. 14 is a second flowchart of a controlling method of a display device according to still another exemplary embodiment.

As shown in FIG. 14, the display device 100 displays an execution screen of an application divided into a plurality of areas (S1410). When the execution screen of the application divided into the plurality of areas is displayed, the display device 100 extracts the source information related to the area to be transmitted to the peripheral device among the plurality of areas constituting the execution screen of the application (S1420). When the source information is extracted, the display device 100 transmits the extracted source information to the peripheral device 200 (S1430). Accordingly, the peripheral device 200 can display information on an area related to the received source information among a plurality of areas constituting an execution screen of the application, based on the source information received from the display device 100.

The operations of steps S1410 to S1430 described above are the same as those of steps S1310 to S1330 of FIG. 13 described above. Therefore, detailed description of operation of steps S1410 to S1430 will be omitted below.

On the other hand, when the source information extracted in step S1430 is transmitted to the peripheral device 200, the display device 100 edits an execution screen of an application based on a remaining area excluding an area relating to source information transmitted to the peripheral device from among a plurality of areas constituting the execution screen of the application and display the execution screen of the edited application (S1440).

For example, the application execution screen is divided into first to third areas, and the source information related to the first one of the first to third areas is transmitted to the peripheral device 200 adjacent to the display device 100. In this case, the display device 100 can reconstruct and display an execution screen for the application based on the second and third areas except for the first area of the first to third areas.

Meanwhile, when an execution screen return command is input or an event is detected in which the peripheral device 200 transmitting the source information is not close, the display device 100 may re-edit and display the edited execution screen as an initial execution screen of the application.

When an event for transmitting source information related to an area changed to the peripheral device 200 occurs, the display device 100 may re-edit the edited execution screen based on the remaining area except for the changed area among the plurality of areas, and display the execution screen of the re-edited application.

The foregoing exemplary embodiments and advantages are merely exemplary and are not to be construed as limiting the inventive concept. The exemplary embodiments may be readily applied to other types of device or apparatus. Also, the description of the exemplary embodiments is intended to be illustrative, and not to limit the scope of the inventive concept, and many alternatives, modifications, and variations will be apparent to those skilled in the art.

What is claimed is:

1. A method for controlling a display device comprising:
   displaying an execution screen of an application which is divided into a plurality of regions;
   extracting source information related to a first region, from among the plurality of regions, to be transmitted to a first peripheral device, wherein the source information comprises at least one of an execution code and resource for executing the first region to be transmitted to the first peripheral device, and the extracting comprises extracting source information relating to the first region by analyzing predetermined source information relating to the first region and an execution code for executing the first region;
   editing the execution screen based on a region other than the first region;
   transmitting the extracted source information to the first peripheral device; and
   based on transmitting extracted source information to the first peripheral device, displaying the edited execution screen.

2. The method of claim 1, wherein the first region is identified based on a position of the first peripheral device.

3. The method of claim 2, further comprising, based on an execution screen return command being input or the first peripheral device being identified as being greater than a predetermined distance from the display device, re-editing and displaying the re-edited execution screen as an initial execution screen of the application.

4. The method of claim 1, wherein the first region is identified based on device information of the first peripheral device.

5. The method of claim 1, wherein the first region is identified based on device information of the first peripheral device and execution information of the plurality of regions.

6. The method of claim 5, wherein the first region is a region for receiving a user command or for displaying user information, and the method further comprises extracting the source information for a second region, from among the plurality of regions, for displaying content and transmitting the extracted source information for the second region to a second peripheral device different from the first peripheral device.

7. The method of claim 1, wherein the first region corresponds to a region for receiving a user command.

8. The method of claim 1, further comprising:
   controlling an operation of the application based on a command received from the first peripheral device.

9. A display device comprising:
   a communicator configured to perform data communication with a first peripheral device capable of communication;
   a display configured to display an execution screen of an application which is divided into a plurality of regions; and
   a controller configured to:
   control the communicator to extract source information related to a first region, from among the plurality of regions, to be transmitted to the first peripheral device, wherein the source information comprises at least one of an execution code and a resource for executing the first region to be transmitted to the first peripheral device, and the extracting comprises extracting source information relating to the first region by analyzing predetermined source information relating to the first region and an execution code for executing the first region;
   edit the execution screen based on a region other than the first region;

transmit the extracted source information to the first peripheral device; and based on transmitting the extracted source information to the first peripheral device, display the edited execution screen.

10. The display device of claim 9, further comprising:

at least one sensor, wherein the processor is configured to identify, based on the sensor, a position of the first peripheral device and identify, as the first region, a region relating to the identified position.

11. The display device of claim 9, wherein the processor is configured to identify, as the first region, a region based on device information of the first peripheral device.

12. The display device of claim 9, wherein the processor is configured to identify, as the first region, a region based on device information of the first peripheral device and execution information of the plurality of regions.

13. The display device of claim 12, wherein the processor is configured to, based on the first region being a region for receiving a user command or for displaying user information, control transmitting source information of the first region to the first peripheral device according to a first condition and, based on a second region different from the first region being a region for displaying content, control transmitting source information of the second region to a second peripheral device according to a second condition.

* * * * *